US010578188B2

(12) United States Patent
Kojima

(10) Patent No.: US 10,578,188 B2
(45) Date of Patent: Mar. 3, 2020

(54) VIBRATION DAMPING DEVICE

(71) Applicant: BRIDGESTONE CORPORATION, Tokyo (JP)

(72) Inventor: Hiroshi Kojima, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/747,886

(22) PCT Filed: Aug. 3, 2016

(86) PCT No.: PCT/JP2016/072795
§ 371 (c)(1),
(2) Date: Jan. 26, 2018

(87) PCT Pub. No.: WO2017/038357
PCT Pub. Date: Mar. 9, 2017

(65) Prior Publication Data
US 2018/0223946 A1 Aug. 9, 2018

(30) Foreign Application Priority Data

Sep. 2, 2015 (JP) .................. 2015-172499

(51) Int. Cl.
*F16F 1/38* (2006.01)
*F16F 13/14* (2006.01)
*F16F 15/08* (2006.01)

(52) U.S. Cl.
CPC .......... *F16F 13/1418* (2013.01); *F16F 13/14* (2013.01); *F16F 13/1445* (2013.01);
(Continued)

(58) Field of Classification Search
CPC .... F16F 13/16; F16F 13/1427; F16F 13/1409; F16F 13/1463
See application file for complete search history.

(56) References Cited

U.S. PATENT DOCUMENTS 4,756,514 A 7/1988 Kanda
2003/0151178 A1 8/2003 Vossel et al.
(Continued)

FOREIGN PATENT DOCUMENTS

EP 0754877 A1 * 1/1997 .............. F16F 13/16
EP 1 387 111 A1 2/2004
(Continued)

OTHER PUBLICATIONS

Machine translation of EP 1387111, retrieved Jan. 10, 2019 (Year: 2019).*

(Continued)

*Primary Examiner* — Bradley T King
(74) *Attorney, Agent, or Firm* — Sughrue Mion, PLLC

(57) ABSTRACT

A vibration damping device (10) comprises a tubular outer attachment member (11) and an inner attachment member (12); a pair of main rubber portions (13) that couple the outer attachment member (11) to the inner attachment member (12), and that are arranged so as to be spaced in an axial direction along a central axis (O) of the outer attachment member (11); and a partition portion (15) that couples the outer attachment member (11) to the inner attachment member (12), and that partitions a liquid chamber (25) between the pair of main rubber portions (13), in the axial direction, into a first liquid chamber (26) and a second liquid chamber (27). The partition portion (15) comprises an annular rigid portion (30) in which a restricted passage (33) that connects the first liquid chamber (26) to the second liquid chamber (27) is formed, and an annular elastic portion (29) that is adjacent to the rigid portion (31) in the radial direction. The elastic portion (29) is compressed and deformed in the radial direction and makes contact with the rigid portion (30) in an unbonded state.

9 Claims, 1 Drawing Sheet

(52) U.S. Cl.
CPC ...... *F16F 13/1463* (2013.01); *F16F 13/1481* (2013.01); *F16F 15/08* (2013.01); *F16F 2224/025* (2013.01); *F16F 2234/02* (2013.01); *F16F 2236/04* (2013.01); *F16F 2238/04* (2013.01)

(56) References Cited

U.S. PATENT DOCUMENTS

| | | | |
|---|---|---|---|
| 2006/0261531 A1 | 11/2006 | Kim | |
| 2009/0189323 A1* | 7/2009 | Endo | F16F 13/1409 267/140.12 |
| 2013/0038006 A1 | 2/2013 | Saito et al. | |
| 2016/0084340 A1* | 3/2016 | Kadowaki | F16F 13/1409 267/141.7 |
| 2017/0299008 A1* | 10/2017 | Satou | B60K 5/12 |

FOREIGN PATENT DOCUMENTS

| | | |
|---|---|---|
| FR | 2 832 478 A1 | 5/2003 |
| GB | 2 345 114 A | 6/2000 |
| JP | 62-118135 A | 5/1987 |
| JP | 63-006250 U | 1/1988 |
| JP | 05-083496 U | 11/1993 |
| JP | 2007-309507 A | 11/2007 |
| JP | 2011-196453 A | 10/2011 |
| WO | 02/084143 A1 | 10/2002 |

OTHER PUBLICATIONS

Machine translation of EP 0 754 877, retrieved May 24, 2019 (Year: 2019).*
Communication dated Sep. 20, 2018 from the European Patent Office in counterpart Application No. 16841389.6.
International Search Report of PCT/JP2016/072795 dated Sep. 13, 2016 [PCT/ISA/210].

* cited by examiner

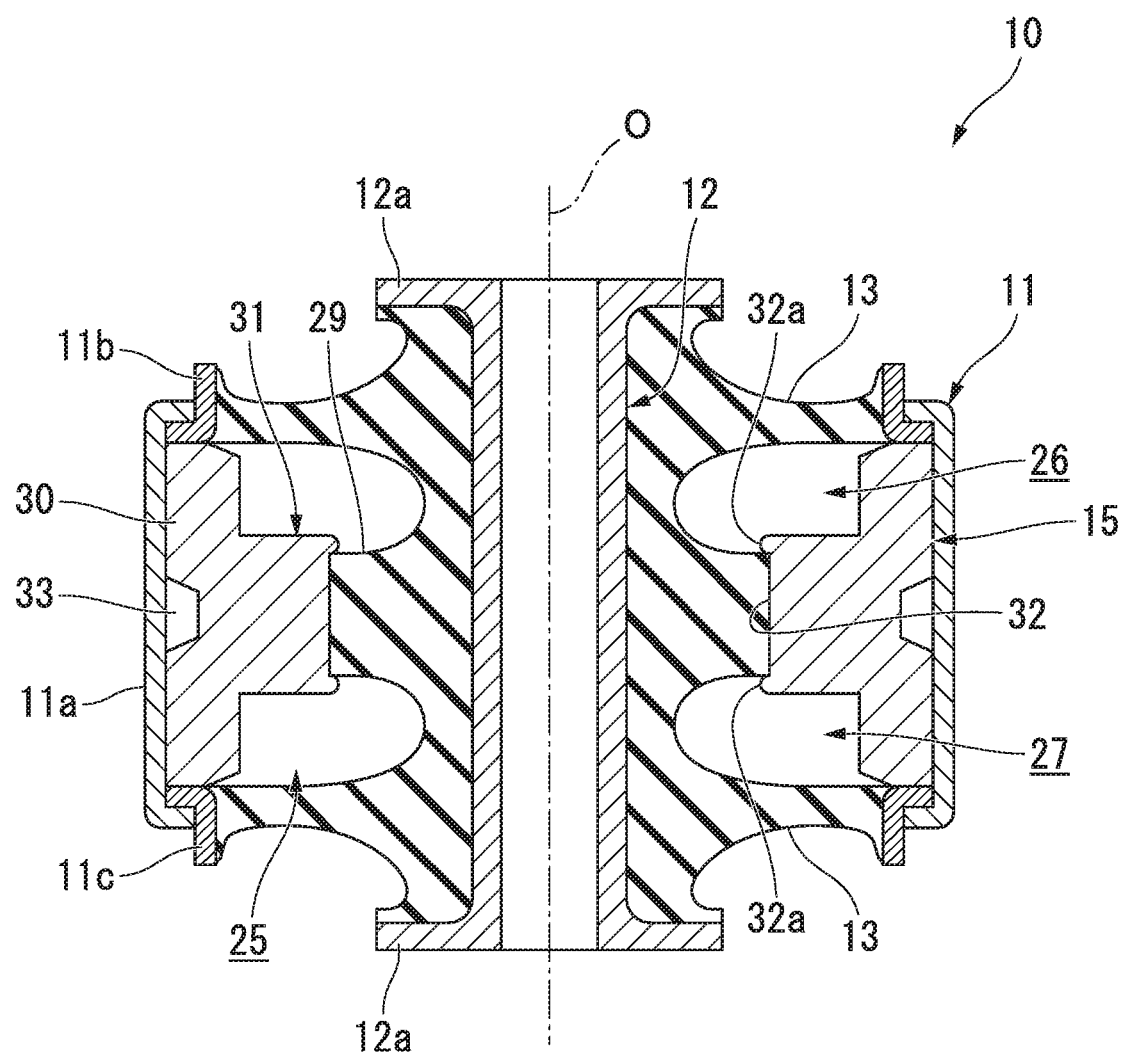

VIBRATION DAMPING DEVICE

CROSS REFERENCE TO RELATED APPLICATIONS

This application is a National Stage of International Application No. PCT/JP2016/072795, filed Aug. 3, 2016, claiming priority based on Japanese Patent Application No. 2015-172499, filed Sep. 2, 2015, the contents of all of which are incorporated herein by reference in their entirety.

TECHNICAL FIELD

The present invention relates to a vibration damping device.

BACKGROUND ART

Conventionally, vibration damping devices such as that described, for example, in the below-mentioned Patent Document 1 have been known. This vibration damping device comprises a tubular outer attachment member and an inner attachment member that is provided on an inner side of the outer attachment member; a pair of main rubber portions that couple the outer attachment member to the inner attachment member, and that are arranged so as to be spaced in an axial direction along a central axis of the outer attachment member; and a partition portion that couples the outer attachment member to the inner attachment member, and that partitions a liquid chamber between the pair of main rubber portions, in the axial direction, into a first liquid chamber and a second liquid chamber. The partition portion comprises an annular rigid portion in which a restricted passage that connects the first liquid chamber to the second liquid chamber is formed, and an annular elastic portion that is adjacent to the rigid portion in the radial direction.

According to this vibration damping device, when vibrations are introduced, a liquid passes back and forth through the restricted passage between the first chamber and the second chamber, thereby attenuating and absorbing the introduced vibrations.

RELATED DOCUMENT

Patent Document

[Patent Document 1]
 JP 2011-196453 A

SUMMARY OF INVENTION

Technical Problem

However, the aforementioned conventional vibration damping device has the problem wherein the spring constant tends to increase at the time of introduction of the vibrations.

The present invention was made in view of the aforementioned circumstances, and has the purpose of suppressing the increase in the spring constant at the time of introduction of the vibrations.

Solution to Problem

In order to solve the above-mentioned problem and achieve the stated purpose, the vibration damping device of the present invention comprises a tubular outer attachment member that is coupled to one of a vibration-generating portion and a vibration-receiving portion, and an inner attachment member that is provided on an inner side of the outer attachment member and that is coupled to the other of the vibration-generating portion and the vibration-receiving portion; a pair of main rubber portions that couple the outer attachment member to the inner attachment member, and that are arranged so as to be spaced in an axial direction along a central axis of the outer attachment member; and a partition portion that couples the outer attachment member to the inner attachment member, and that partitions a liquid chamber between the pair of main rubber portions, in the axial direction, into a first liquid chamber and a second liquid chamber. The partition portion comprises an annular rigid portion in which a restricted passage that connects the first liquid chamber to the second liquid chamber is formed, and an annular elastic portion that is adjacent to the rigid portion in a radial direction orthogonal to the central axis in plan view when viewed from the axial direction. The elastic portion is compressed and deformed in the radial direction and makes contact with the rigid portion in an unbonded state.

Advantageous Effects of Invention

According to the present invention, it is possible to suppress increases in the spring constant when vibrations are introduced.

BRIEF DESCRIPTION OF DRAWINGS

FIG. 1 is a vertical section view of a vibration damping device according to one embodiment of the present invention.

DESCRIPTION OF EMBODIMENTS

Hereinbelow, a vibration damping device 10 according to an embodiment of the present invention will be explained with reference to the drawings.

As shown in FIG. 1, the vibration damping device 10 is of the so-called liquid-sealed type in which a liquid (e.g., ethylene glycol, water, silicone oil or the like) is sealed in the interior thereof. The vibration damping device 10 is applied, for example, to a cabin mount or the like.

The vibration damping device 10 comprises a tubular outer attachment member 11 that is coupled to one of a vibration-generating portion and a vibration-receiving portion, which are not shown, and an inner attachment member 12 that is provided on an inner side of the outer attachment member 11 and that is coupled to the other of the vibration-generating portion and the vibration-receiving portion; a pair of main rubber portions 13 that couple the outer attachment member 11 to the inner attachment member 12, and that are arranged so as to be spaced in an axial direction along a central axis O of the outer attachment member 11; and a partition portion 15 that couples the outer attachment member 11 to the inner attachment member 12, and that partitions a liquid chamber 25 between the pair of main rubber portions 13, in the axial direction, into a first liquid chamber 26 and a second liquid chamber 27.

Hereinbelow, in plan view seen from the axial direction, the direction orthogonal to the central axis O will be referred to as the radial direction, and the direction around the central axis O will be referred to as the circumferential direction.

The outer attachment member 11 comprises a main tube 11a, an upper ring element 11b that fits inside the upper end of the main tube 11a, and a lower ring element 11c that fits inside the lower end of the main tube 11a.

The inner attachment member 12 is formed in the shape of a tube that is arranged so as to be coaxial with the central axis O. Both axial ends of the inner attachment member 12 protrude outward, in the axial direction, from the outer attachment member 11. Both axial ends of the inner attachment member 12 have flange portions 12a that protrude radially outward and that extend around the entire circumference.

The pair of main rubber portions 13 are formed so as to have an annular shape and are arranged so as to be coaxial with the central axis O. The inner circumferences of the main rubber portions 13 are vulcanization-bonded to the inner attachment member 12 and the outer circumferences of the main rubber portions 13 are vulcanization-bonded to the outer attachment member 11. The inner circumferences of the main rubber portions 13 are integrally connected in an area spanning from the outer circumferential surfaces of the axial ends of the inner attachment member 12 to the flange portions 12a. The outer circumferences of the pair of main rubber portions 13 are respectively coupled to the upper ring element 11b and the lower ring element 11c of the outer attachment member 11.

Additionally, in the present embodiment, the partition portion 15 comprises an annular rigid portion 30 in which a restricted passage 33 that connects the first liquid chamber 26 to the second liquid chamber 27 is formed, and an annular elastic portion 29 that is adjacent to the rigid portion 30 in the radial direction. The elastic portion 29 is compressed and deformed in the radial direction and makes contact with the rigid portion 30 in an unbonded state. A single partition portion 15 is provided between the pair of main rubber portions 13 in the axial direction. The first liquid chamber 26 and the second liquid chamber 27 are each formed so as to be annular and to extend continuously around the entire circumference, and one of each is provided.

The rigid portion 30 extends continuously around the entire circumference. The rigid portion 30 is fitted into an area located between the upper ring element 11b and the lower ring element 11c inside the main tube 11a of the inner attachment member 11. The edges of the openings at both axial ends of the rigid portion 30 are respectively in liquid-tight contact with the edge of the lower end of the upper ring element 11b and the edge of the upper end of the lower ring element 11c. The restricted passage 33 is formed on the outer circumferential surface of the rigid portion 30.

The elastic portion 29 is formed from a rubber material and extends continuously around the entire circumference. The vertical cross-section of the elastic portion 29 along the axial direction is rectangular. The elastic portion 29 is vulcanization-bonded to the outer circumferential surface of the inner attachment member 12 and is fitted to the inner side of the rigid portion 30. The elastic portion 29 is formed integrally with the pair of main rubber portions 13. As a result thereof, the outer circumferential surface of the inner attachment member 12 is covered with rubber material on the entirety thereof.

The rigid portion 30 has, formed therein, a protrusion portion 31 that protrudes radially inward, with which the outer circumferential surface of the elastic portion 29 makes contact. The vertical cross-section of the protrusion portion 31 in the axial direction is rectangular. The area of contact of the elastic portion 29 with the inner circumferential surface (top surface) 32 of the protrusion portion 31 is smaller than the area of the inner circumferential surface 32 of the protrusion portion 31. The axial size of the inner circumferential surface 32 of the protrusion portion 31 is greater than the axial size of the outer circumferential surface of the elastic portion 29. The outer circumferential surface of the elastic portion 29 is located on the inner side, in the axial direction, relative to the inner circumferential surface 32 of the protrusion portion 31.

Both axial ends of the inner circumferential surface 32 of the protrusion portion 31 have, formed respectively thereon, ridge portions 32a that extend continuously or extend intermittently around the entire circumference. These ridge portions 32a prevent relative axial displacement between the inner circumferential surface 32 of the protrusion portion 31 and the outer circumferential surface of the elastic portion 29.

As explained above, according to the vibration damping device 10 of the present embodiment, when vibrations are introduced, the pair of main rubber portions 13 elastically deform. Furthermore, the liquid pressures in the first liquid chamber 26 and the second liquid chamber 27 fluctuate so that the liquid passes back and forth through the restricted passage 33 between the first chamber 26 and the second chamber 27, thereby attenuating and absorbing the introduced vibrations. At this time, the elastic portion 29 is not bonded to the rigid portion 30 but is compressed and deformed in the radial direction and makes contact with the rigid portion 30 in the unbonded state. Therefore, not only is the elastic portion 29 deformed, but relative displacement between the elastic portion 29 and the rigid portion 30 is also made possible. As a result thereof, the liquid pressure fluctuations that occur respectively in the first liquid chamber 26 and the second liquid chamber 27 are mitigated, and increases in the spring constant at the time of introduction of vibrations can be suppressed.

When large-amplitude vibrations are introduced, the elastic portion 29 and the rigid portion 30 are separated, and it is possible to allow direct communication between the first liquid chamber 26 and the second liquid chamber 27 through this gap, thereby making it possible to even more reliably suppress the aforementioned increases in the spring constant. It is also possible to not allow separation between the elastic portion 29 and the rigid portion 30 even when large-amplitude vibrations are introduced.

Since the protrusion portion 31 is formed on the rigid portion 30, it is possible to ensure that the elastic portion 29 can be compressed and deformed in the radial direction to a certain amount while limiting the size of the elastic portion 29 in the radial direction. Therefore, the bending rigidity, in the axial direction, of the elastic portion 29 is raised, while achieving stable vibration damping performance.

The area of contact of the elastic portion 29 with the inner circumferential surface 32 of the protrusion portion 31 is smaller than the area of the inner circumferential surface 32 of the protrusion portion 31, thereby ensuring that the protrusion portion 31 has adequate rigidity in the axial direction. Furthermore, it is possible to prevent the elastic portion 29 coming loose from the rigid portion 30 when the liquid pressure inside the liquid chamber 25 rises and the elastic portion 29 is deformed or displaced.

Since the rigid portion 30 formed on the restricted passage 33 is provided radially outside of the elastic portion 29, it is possible to easily obtain an adequate flow path length for the restricted passage 33, and a vibration damping device 10 that is easy to tune can be obtained.

Since the elastic portion 29 is formed integrally with the main rubber portions 13, the vibration damping device 10 can be easily formed.

The technical scope of the present invention is not to be construed as being limited to the above-described embodiment, and it is possible to add various modifications within a range not departing from the spirit of the present invention.

For example, in the above-described embodiment, a configuration in which the first liquid chamber 26 and the second liquid chamber 27 are each formed so as to be annular and to extend continuously around the entire circumference, and one of each is provided, was indicated. However, it is also possible to divide the first liquid chamber 26 and the second liquid chamber 27 into multiple sections in the circumferential direction, and to form, in the partition, multiple restricted passages separately connecting the multiple divided first liquid chambers with the second liquid chambers.

Instead of the above-described embodiment, it is also possible, for example, to use a configuration wherein the elastic portion is vulcanization-bonded to the inner circumferential surface of the outer attachment member and the rigid portion is fitted inside this elastic portion.

A protrusion portion 31 need not be formed on the rigid portion 30.

Instead of the above-described embodiment, it is also possible, for example, to set the area of contact of the elastic portion 29 with the inner circumferential surface 32 of the protrusion potion 31 to be equal to or larger than the area of the inner circumferential surface 32 of the protrusion portion 31.

The elastic portion 29 may be configured to be separated from the main rubber portions 13.

A ridge portion 32a need not be formed on the inner circumferential surface 32 of the protrusion portion 31.

The vibration damping device 10 is not limited to being a cabin mount for a vehicle. The present invention may be applied, for example, to engine mounts and bushes for vehicles, mounts for power generators mounted on construction machinery, and mounts for machinery installed in factories or the like.

Aside therefrom, the elements in the aforementioned embodiment may be appropriately replaced with well-known elements, or the aforementioned modification examples may be appropriately combined, within a range not departing from the spirit of the present invention.

INDUSTRIAL APPLICABILITY

According to the vibration damping device of the present invention, it is possible to suppress increases in the spring constant when vibrations are introduced.

REFERENCE SIGNS LIST

10 Vibration damping device
11 Outer attachment member
12 Inner attachment member
13 Main rubber portion
15 Partition portion
25 Liquid chamber
26 First liquid chamber
27 Second liquid chamber
29 Elastic portion
30 Rigid portion
31 Protrusion portion
32 Inner circumferential surface (top surface)
33 Restricted passage
O Central axis

The invention claimed is:

1. A vibration damping device comprising:
    a tubular outer attachment member that is coupled to one of a vibration-generating portion and a vibration-receiving portion, and an inner attachment member that is provided on an inner side of the outer attachment member and that is coupled to the other of the vibration-generating portion and the vibration-receiving portion;
    a pair of main rubber portions that couple the outer attachment member to the inner attachment member, and that are arranged so as to be spaced in an axial direction along a central axis of the outer attachment member; and
    a partition portion that couples the outer attachment member to the inner attachment member, and that partitions a liquid chamber between the pair of main rubber portions, in the axial direction, into a first liquid chamber and a second liquid chamber; wherein:
    the partition portion comprises an annular rigid portion in which a restricted passage that connects the first liquid chamber to the second liquid chamber is formed, and an annular elastic portion that is adjacent to the rigid portion in a radial direction orthogonal to the central axis in plan view when viewed from the axial direction;
    the elastic portion is compressed and deformed in the radial direction and makes contact with the rigid portion in an unbonded state; and
    a protrusion portion that protrudes towards the elastic portion in the radial direction and makes contact with the elastic portion is formed on an axial central portion of the rigid portion, and
    the rigid portion makes contact with an outermost circumferential surface of the elastic portion, the outermost circumferential surface extending parallel with the axial direction.

2. The vibration damping device as in claim 1, wherein the surfaces of the protrusion portion comprise a top surface that faces the elastic portion in the radial direction;
    the elastic portion makes contact with the top surface; and
    an area of contact of the elastic portion with the top surface is smaller than the area of the top surface.

3. The vibration damping device as in claim 1, wherein the elastic portion is fitted on an inner side of the rigid portion.

4. The vibration damping device as in claim 1, wherein the elastic portion is formed integrally with the main rubber portions.

5. The vibration damping device as in claim 2, wherein the elastic portion is fitted on an inner side of the rigid portion.

6. The vibration damping device as in claim 2, wherein the elastic portion is formed integrally with the main rubber portions.

7. The vibration damping device as in claim 3, wherein the elastic portion is formed integrally with the main rubber portions.

8. The vibration damping device as in claim 1, wherein:
    there is no protrusion provided at an axial portion of an outer circumferential surface of the inner attachment member, and
    a first axial position of the axial portion corresponds to a second axial position of the protrusion portion of the rigid portion.

9. The vibration damping device as in claim 1, wherein an innermost surface of the rigid portion makes contact with the outermost circumferential surface of the elastic portion, the innermost circumferential surface extending parallel with the axial direction.

\* \* \* \* \*